United States Patent
Diaz et al.

(10) Patent No.: US 8,892,284 B2
(45) Date of Patent: Nov. 18, 2014

(54) METHOD AND APPARATUS TO DETERMINE EXTREMA FOR CONTROLLING A MULTI-MODE POWERTRAIN SYSTEM

(75) Inventors: Michael Glenn Diaz, Ann Arbor, MI (US); Sean W McGrogan, Ann Arbor, MI (US); Anthony H. Heap, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 202 days.

(21) Appl. No.: 13/547,099

(22) Filed: Jul. 12, 2012

(65) Prior Publication Data

US 2014/0018984 A1    Jan. 16, 2014

(51) Int. Cl.
*G06F 17/11*    (2006.01)

(52) U.S. Cl.
USPC ............................................. 701/22; 701/51

(58) Field of Classification Search
USPC ...................................... 701/22, 51
See application file for complete search history.

(56) References Cited

U.S. PATENT DOCUMENTS 7,645,206 B2    1/2010 Holmes et al.
2005/0080537 A1*    4/2005 Cawthorne et al. ............. 701/51

OTHER PUBLICATIONS

U.S. Appl. No. 13/444,773, Unpubl, Tan, et al.
U.S. Appl. No. 13/495,037, Unpubl, Hessell, et al.

* cited by examiner

*Primary Examiner* — Mary Cheung
*Assistant Examiner* — Yuen Wong

(57) ABSTRACT

A powertrain system includes an internal combustion engine, a multi-mode transmission having a plurality of torque machines, and a driveline. A method to determine extrema for an objective function employed to control operation of the powertrain system includes establishing an objective component equation related to an objective function and corresponding to an object component of interest. A plurality of linear constraints and a non-linear constraint are imposed on the objective component equation. The objective component equation is solved in relation to the plurality of linear constraints and the non-linear constraint to determine the extrema for the objective function. The extrema for the objective function are employed to control operation of the powertrain system.

20 Claims, 8 Drawing Sheets

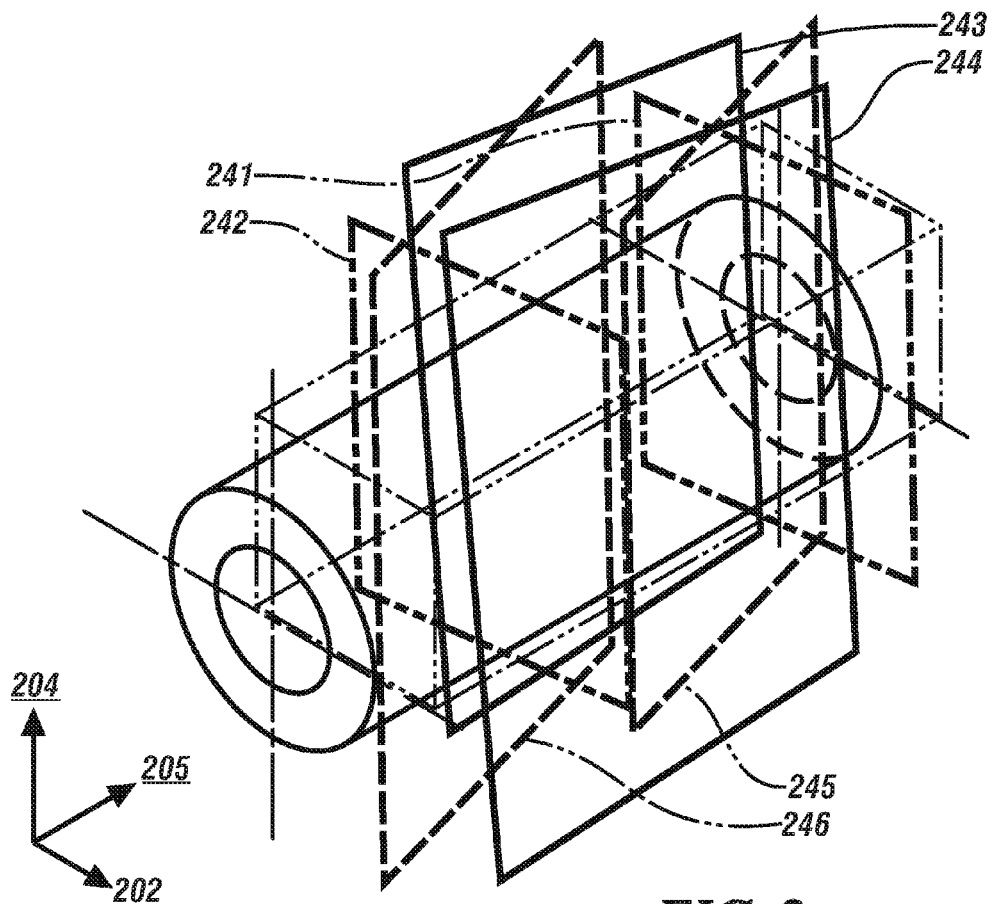
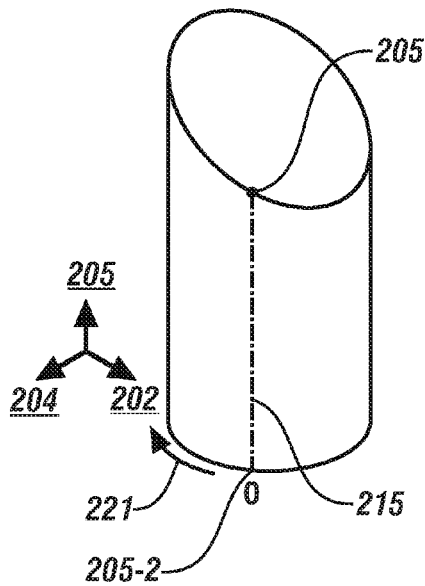
FIG. 2-4
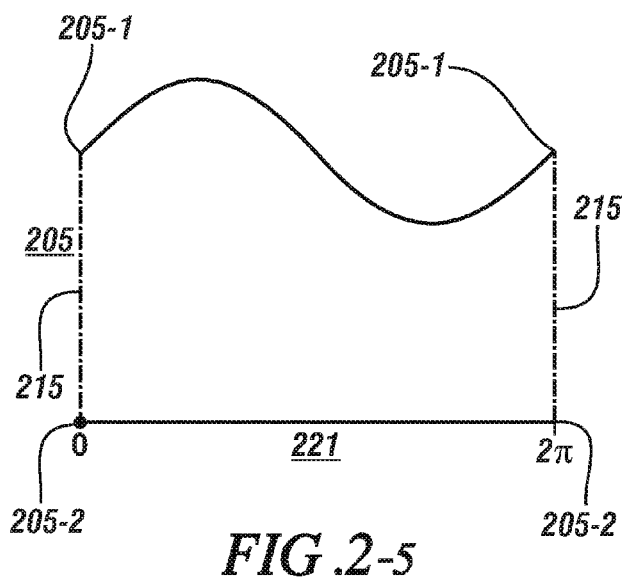
FIG. 2-5
FIG. 2-3

_US 8,892,284 B2_

METHOD AND APPARATUS TO DETERMINE EXTREMA FOR CONTROLLING A MULTI-MODE POWERTRAIN SYSTEM

TECHNICAL FIELD

This disclosure is related to multi-mode powertrain systems employing multiple torque-generative devices, and dynamic system controls associated therewith.

BACKGROUND

The statements in this section merely provide background information related to the present disclosure. Accordingly, such statements are not intended to constitute an admission of prior art.

Powertrain systems may be configured to transfer torque originating from multiple torque-generative devices through a torque transmission device to an output member that may be coupled to a driveline. Such powertrain systems include hybrid powertrain systems and extended-range electric vehicle systems. Control systems for operating such powertrain systems operate the torque-generative devices and apply torque transfer elements in the transmission to transfer torque in response to operator-commanded output torque requests, taking into account fuel economy, emissions, driveability, and other factors. Exemplary torque-generative devices include internal combustion engines and non-combustion torque machines. The non-combustion torque machines may include electric machines that are operative as motors or generators to generate a torque input to the transmission independently of a torque input from the internal combustion engine. The torque machines may transform vehicle kinetic energy transferred through the vehicle driveline to electrical energy that is storable in an electrical energy storage device in what is referred to as a regenerative operation. A control system monitors various inputs from the vehicle and the operator and provides operational control of the hybrid powertrain, including controlling transmission operating state and gear shifting, controlling the torque-generative devices, and regulating the electrical power interchange among the electrical energy storage device and the electric machines to manage outputs of the transmission, including torque and rotational speed.

Known hybrid powertrain systems employing engines, torque machines, and transmission devices are configured with gear sets, rotating connecting members, and torque-transfer clutch devices to transfer torque. Components of hybrid powertrain systems are subject operating limits, i.e., maximum and minimum torques or accelerations that they can carry or produce due to mechanical, electrical, thermal and material constraints. These constraints can be characterized as linear and nonlinear limits that can be imposed on a component for purposes of control and protection.

SUMMARY

A powertrain system includes an internal combustion engine, a multi-mode transmission having a plurality of torque machines, and a driveline. A method to determine extrema for an objective function employed to control operation of the powertrain system includes establishing an objective component equation related to an objective function and corresponding to an object component of interest. A plurality of linear constraints and a non-linear constraint are imposed on the objective component equation. The objective component equation is solved in relation to the plurality of linear constraints and the non-linear constraint to determine the extrema for the objective function. The extrema for the objective function are employed to control operation of the powertrain system.

BRIEF DESCRIPTION OF THE DRAWINGS

One or more embodiments will now be described, by way of example, with reference to the accompanying drawings, in which:

FIG. 2-1 graphically shows a two-dimensional perspective of highest priority, independent variables X1 and X2 in relation to battery power for an operating point, in accordance with the disclosure;

FIG. 2-2 graphically shows a three-dimensional perspective of transformed motor torques in relation to transformed battery power limits, in accordance with the disclosure;

FIG. 2-3 graphically shows the three-dimensional perspective of motor torques in relation to battery power shown with reference to FIG. 2-2, and depicting dependent component torque and/or acceleration constraints that are described as Y2, Y3, . . . Yn, in accordance with the disclosure;

FIG. 2-4 graphically shows a three-dimensional representation of data for the third independent variable X3 as circumscribed by one of the maximum battery power limit and the minimum battery power limit, in accordance with the disclosure;

FIG. 2-5 graphically shows a two-dimensional representation of the data for the third independent variable X3 as circumscribed by one of the cylinders 211 and 213 truncated with a single one of the Yn dependent constraints, in accordance with the disclosure;

FIG. 2-6 graphically shows a linear transformation of the data representing the third independent variable X3 to Y1, which represents the object component of interest, e.g., a torque or a rotational speed/acceleration, in accordance with the disclosure;

FIG. 2-7 graphically shows a 2-dimensional rectilinear plot showing the linear transformation of the data representing the third independent variable X3 to Y1 representing the object component of interest in relation to minimum and maximum states for the dependent component torque and/or acceleration constraints, in accordance with the disclosure;

FIG. 2-8 graphically shows the 2-dimensional rectilinear plot of FIG. 2-7 that incorporates constraints associated with X1, X2, and X3, and identifies feasible regions that are achievable within all the constraints, in accordance with the disclosure; and FIGS. 3-1 through 3-4 schematically show a control scheme to control operation of an embodiment of the powertrain system described with reference to FIG. 1, in accordance with the disclosure.

DETAILED DESCRIPTION

Figure 1:
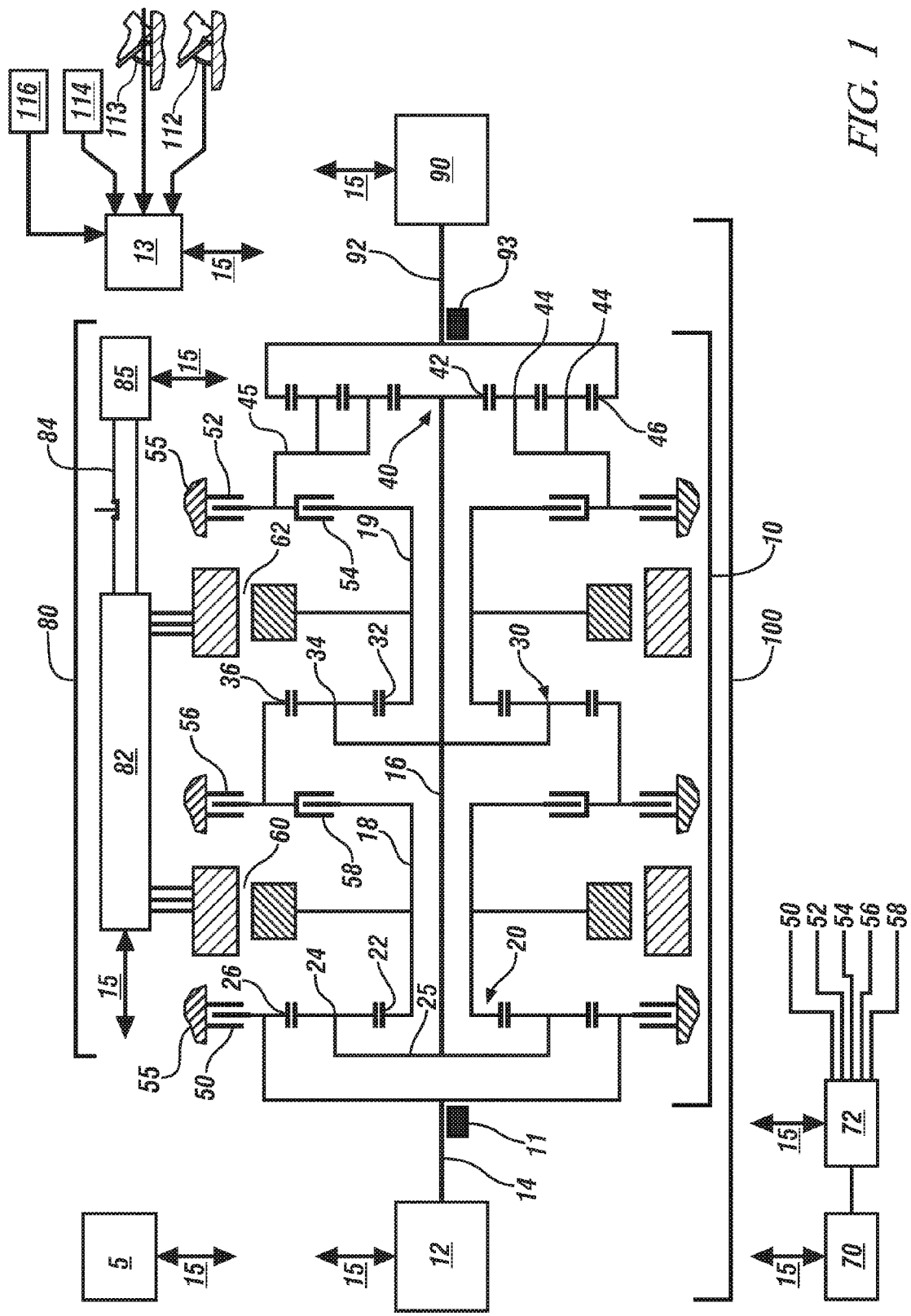
FIG. 1 schematically shows a multi-mode powertrain system including an internal combustion engine, transmission, driveline, and a controller, in accordance with the disclosure.

Referring now to the drawings, wherein the showings are for the purpose of illustrating certain exemplary embodiments only and not for the purpose of limiting the same, FIG. 1 depicts a non-limiting powertrain system 100 including an internal combustion engine (engine) 12, a multi-mode transmission (transmission) 10, a high-voltage electrical system 80, a driveline 90, and a controller 5. The transmission 10 mechanically couples to the engine 12 and first and second torque machines 60 and 62 respectively, and is configured to transfer torque between the engine 12, the torque machines 60, 62, and the driveline 90. As illustrated, the first and second torque machines 60, 62 are electric motor/generators.

The high-voltage electrical system 80 includes an electrical energy storage device (ESD) 85 electrically coupled to a transmission power inverter control module (TPIM) 82 via a high-voltage electrical bus 84, and is configured with suitable devices for monitoring electric power flow including devices and systems for monitoring electric current and voltage. The ESD 85 can be any suitable high-voltage electrical energy storage device, e.g., a high-voltage battery, and preferably includes a monitoring system that provides a measure of electrical power supplied to the high-voltage bus electrical 84, including voltage and electric current.

The engine 12 may be any suitable combustion device, and includes a multi-cylinder internal combustion engine selectively operative in several states to transfer torque to the transmission 10 via an input member 14, and can be either a spark-ignition or a compression-ignition engine. The engine 12 includes a crankshaft coupled to the input member 14 of the transmission 10. A rotational speed sensor 11 monitors crank angle and rotational speed of the input member 14. Power output from the engine 12, i.e., rotational speed multiplied by engine torque, can differ from the input speed and the input torque to the transmission 10 due to placement of torque-consuming components on the input member 14 between the engine 12 and the transmission 10, e.g., a torque management device. The engine 12 is configured to execute autostop and autostart operations during ongoing powertrain operation in response to operating conditions. The controller 5 is configured to control actuators of the engine 12 to control combustion parameters including controlling intake mass airflow, spark-ignition timing, injected fuel mass, fuel injection timing, EGR valve position to control flow of recirculated exhaust gases, and intake and/or exhaust valve timing and phasing on engines so equipped. Hence, engine speed can be controlled by controlling combustion parameters including airflow torque and spark induced torque. Engine speed may also be controlled by controlling reaction torque at the input member 14 by controlling motor torques of first and second torque machines 60 and 62, respectively.

The illustrated transmission 10 is a four-mode, compound-split, electro-mechanical transmission 10 that includes three planetary-gear sets 20, 30, and 40, and five engageable torque-transferring devices, i.e., clutches C1 52, C2 54, C3 56, C4 58, and C5 50. Other embodiments of the transmission are contemplated. The transmission 10 couples to first and second torque machines 60 and 62, respectively. The transmission 10 is configured to transfer torque among the engine 12, the torque machines 60, 62, and the output member 92 in response to an output torque request. The first and second torque machines 60, 62 in one embodiment are motor/generators that employ electric energy to generate and react torque. The planetary gear set 20 includes a sun gear member 22, a ring gear member 26, and planet gears 24 coupled to a carrier member 25. The carrier member 25 rotatably supports the planet gears 24 that are disposed in meshing relationship with both the sun gear member 22 and the ring gear member 26, and couples to rotatable shaft member 16. The planetary gear set 30 includes a sun gear member 32, a ring gear member 36, and planet gears 34 coupled to a carrier member 35. The planet gears 34 are disposed in meshing relationship with both the sun gear member 32 and the ring gear member 36. The carrier member 35 couples to the rotatable shaft member 16. The planetary gear set 40 includes a sun gear member 42, a ring gear member 46, and planet gears 44 coupled to a carrier member 45. As shown, there are first and second sets of planet gears 44 coupled to the carrier member 45. Thus, the planetary gear set 40 is a compound, sun gear member-pinion gear-pinion gear-ring gear member gear set. The carrier member 45 rotatably couples between clutches C1 52 and C2 54. The sun gear member 42 rotatably couples to the rotatable shaft member 16. The ring gear member 46 rotatably couples to the output member 92.

As used herein, clutches refer to torque transfer devices that can be selectively applied in response to a control signal, and may be any suitable devices including by way of example single or compound plate clutches or packs, one-way clutches, brakes, and band clutches. A hydraulic circuit 72 is configured to control clutch states of each of the clutches, with pressurized hydraulic fluid supplied by an electrically-powered hydraulic pump 70 that is operatively controlled by the controller 5. Clutches C2 54 and C4 58 are hydraulically-applied rotating friction clutches. Clutches C1 52, C3 56, and C5 50 are hydraulically-controlled brake devices that can be grounded to a transmission case 55. Each of the clutches C1 52, C2 54, C3 56, and C4 58 is hydraulically applied using pressurized hydraulic fluid supplied by the hydraulic control circuit 72 in this embodiment. The hydraulic circuit 72 is operatively controlled by the controller 5 to activate and deactivate the aforementioned clutches, provide hydraulic fluid for cooling and lubricating elements of the transmission, and provide hydraulic fluid for cooling the first and second torque machines 60 and 62. Hydraulic pressure in the hydraulic circuit 72 may be determined by measurement using pressure sensor(s), by estimation using on-board algorithms, or using other suitable methods.

The first and second torque machines 60 and 62 are three-phase AC motor/generator machines, each including a stator, a rotor, and a resolver. The motor stator for each of the torque machines 60, 62 is grounded to an outer portion of the transmission case 55, and includes a stator core with coiled electrical windings extending therefrom. The rotor for the first torque machine 60 is supported on a hub plate gear that mechanically attaches to sleeve shaft 18 that couples to the first planetary gear set 20. The rotor for the second torque machine 62 is fixedly attached to sleeve shaft hub 19 that mechanically attaches to the second planetary gear 30. Each of the resolvers is signally and operatively connected to the transmission power inverter control module (TPIM) 82, and each senses and monitors rotational position of the resolver rotor relative to the resolver stator, thus monitoring rotational position of respective ones of first and second torque machines 60 and 62. Additionally, the signals output from the resolvers may be used to determine rotational speeds for first and second torque machines 60 and 62.

The output member 92 of the transmission 10 is rotatably connected to the driveline 90 to provide output power to the driveline 90 that is transferred to one or a plurality of vehicle wheels via differential gearing or a transaxle or another suitable device. The output power at the output member 92 is characterized in terms of an output rotational speed and an output torque. A transmission output speed sensor 93 monitors rotational speed and rotational direction of the output member 92. Each of the vehicle wheels is preferably equipped with a sensor configured to monitor wheel speed to determine vehicle speed, and absolute and relative wheel speeds for braking control, traction control, and vehicle acceleration management.

The input torque from the engine 12 and the motor torques from the first and second torque machines 60 and 62 are generated as a result of energy conversion from fuel or electrical potential stored in the electrical energy storage device (ESD) 85. The ESD 85 is high voltage DC-coupled to the TPIM 82 via the high-voltage electrical bus 84 that preferably include a contactor switch that permits or prohibits flow of electric current between the ESD 85 and the TPIM 82. The TPIM 82 preferably includes a pair of power inverters and respective motor control modules configured to receive torque commands and control inverter states therefrom for providing motor drive or regeneration functionality to meet the motor torque commands. The power inverters include complementary three-phase power electronics devices, and each includes a plurality of insulated gate bipolar transistors for converting DC power from the ESD 85 to AC power for powering respective ones of the first and second torque machines 60 and 62, by switching at high frequencies. The insulated gate bipolar transistors form a switch mode power supply configured to receive control commands. There is a pair of insulated gate bipolar transistors for each phase of each of the three-phase electric machines. States of the insulated gate bipolar transistors are controlled to provide motor drive mechanical power generation or electric power regeneration functionality. The three-phase inverters receive or supply DC power via DC transfer conductors 27 and transform it to or from three-phase AC power, which is conducted to or from the first and second torque machines 60 and 62 for operation as motors or generators via transfer conductors. The TPIM 82 transfers electrical power to and from the first and second torque machines 60 and 62 through the power inverters and respective motor control modules in response to the motor torque commands. Electrical current is transmitted across the high-voltage electrical bus 84 to and from the ESD 85 to charge and discharge the ESD 85.

The controller 5 signally and operatively links to various actuators and sensors in the powertrain system via a communications link 15 to monitor and control operation of the powertrain system, including synthesizing information and inputs, and executing algorithms to control actuators to meet control objectives related to fuel economy, emissions, performance, drivability, and protection of hardware, including batteries of ESD 85 and the first and second torque machines 60 and 62. The controller 5 is a subset of an overall vehicle control architecture, and provides coordinated system control of the powertrain system. The controller 5 may include a distributed control module system that includes individual control modules including a supervisory control module, an engine control module, a transmission control module, a battery pack control module, and the TPIM 82. A user interface 13 is preferably signally connected to a plurality of devices through which a vehicle operator directs and commands operation of the powertrain system. The devices preferably include an accelerator pedal 112, an operator brake pedal 113, a transmission range selector 114 (PRNDL), and a vehicle speed cruise control system 116. The transmission range selector 114 may have a discrete number of operator-selectable positions, including indicating direction of operator-intended motion of the vehicle, and thus indicating the preferred rotational direction of the output member 92 of either a forward or a reverse direction. It is appreciated that the vehicle may still move in a direction other than the indicated direction of operator-intended motion due to rollback caused by location of a vehicle, e.g., on a hill. The user interface 13 may include a single device, as shown, or alternatively may include a plurality of user interface devices directly connected to individual control modules.

The aforementioned control modules communicate with other control modules, sensors, and actuators via the communications link 15, which effects structured communication between the various control modules. The specific communication protocol is application-specific. The communications link 15 and appropriate protocols provide for robust messaging and multi-control module interfacing between the aforementioned control modules and other control modules providing functionality including e.g., antilock braking, traction control, and vehicle stability. Multiple communications buses may be used to improve communications speed and provide some level of signal redundancy and integrity, including direct links and serial peripheral interface (SPI) buses. Communication between individual control modules may also be effected using a wireless link, e.g., a short range wireless radio communications bus. Individual devices may also be directly connected.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The control module has a set of control routines executed to provide the desired functions. Routines are executed, such as by a central processing unit, to monitor inputs from sensing devices and other networked control modules and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event.

The powertrain 100 is configured to operate in one of a plurality of powertrain states, including a plurality of ranges of the transmission 10 and engine states of on and off. When the engine is in the off state, it is unfueled, not firing, and is not spinning. When the engine is in the on state it is fueled, firing, and spinning. The engine may also operate in a fuel cutoff mode, wherein it is spinning but is unfueled and not firing. The transmission 10 is configured to operate in one of a plurality of neutral (neutral), fixed gear (Gear #), variable mode (EVT Mode #), electric vehicle (EV#) and transitional (EV Transitional State # and pseudoGear #) states by selectively activating the clutches C1 150, C2 152, C3 154, C4 156, and C5 158. A pseudoGear state is a variable mode state in which torque output from the transmission is directly proportional to input torque from the engine, and is primarily employed during shifts between EVT modes. Table 1 depicts a plurality of powertrain states including transmission states and engine states for an embodiment of the powertrain 100.

TABLE 1

| Range | Engine State | C1 | C2 | C3 | C4 | C5 |
|---|---|---|---|---|---|---|
| Neutral 1 | on/off | | | | | |
| Neutral 2 | on/off | | | x | | |
| Neutral 3 | on/off | | | | x | |
| PseudoGear 1 | on/off | x | | | | |
| PseudoGear 2 | on/off | | x | | | |
| Neutral | off | | | | | x |
| EVT Mode 1 | on/off | x | | x | | |
| EVT Mode 2 | on/off | x | | | x | |
| EVT Mode 3 | on/off | | | x | x | |

TABLE 1-continued

| Range | Engine State | C1 | C2 | C3 | C4 | C5 |
|---|---|---|---|---|---|---|
| EVT Mode 4 | on/off | | x | x | | |
| EV Transitional State 1 | off | x | | | | x |
| EV Transitional State 2 | off | | x | | | x |
| Gear 1 | on | x | | x | x | |
| Gear 2 | on | x | x | | x | |
| Gear 3 | on | | x | x | x | |
| EV1 | off | x | | x | | x |
| EV2 | off | x | | | x | x |
| EV3 | off | | x | | x | x |
| EV4 | off | | x | x | | x |
| EV Transitional State 3 | off | | x | x | | x |
| Neutral | on/off | | | x | x | |
| PseudoGear 3 | on/off | x | x | | | |
| Neutral | off | | | x | | x |
| Neutral | off | | | | x | x |

A control scheme is executed to identify extrema, i.e., maximum and minimum torques or accelerations that an object component of interest can carry or produce while being subject to constraints imposed by a powertrain system to control operation, with one such powertrain system described with reference to FIG. 1. The method includes generating an objective component equation, which expresses a relationship for a torque or a rotational speed/acceleration for a component of interest which has a plurality of linear constraints and a non-linear constraint imposed thereon. The objective component equation is subject to linear and non-linear constraints that can be converted to equations representing lines, planes, and cylinders. A multi-plane-cut cylinder constrained by three independent variables is converted to a problem having a single independent variable. A solution set that includes a minimal set of winning candidates can be analyzed to identify ideal or preferred minimum and maximum states for the objective component equation. The objective component equation is described herein in context of an object component of interest. This is shown graphically with reference to FIGS. 2-1 through 2-8, and described in detail with reference to FIGS. 3-1 through 3-4.

Figures 1, 2:
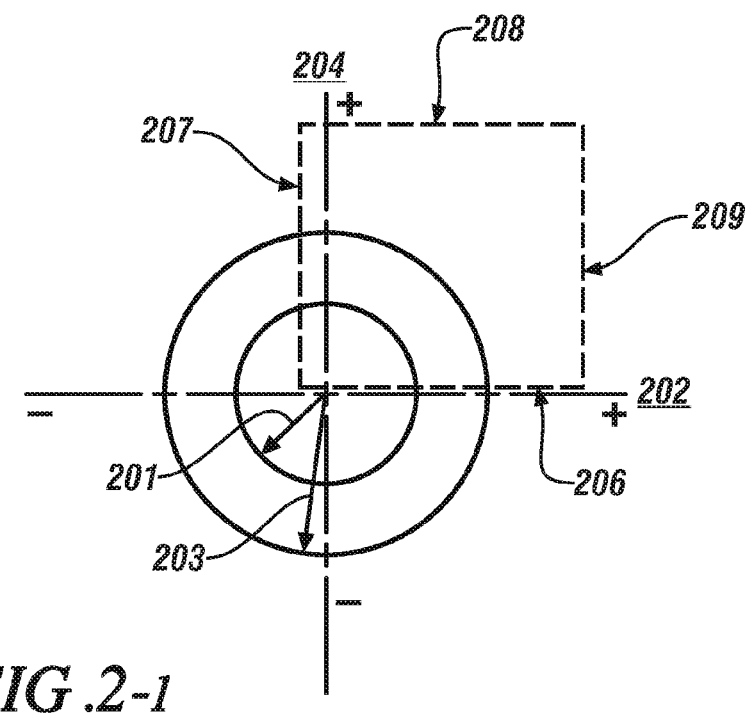
Figure 2:
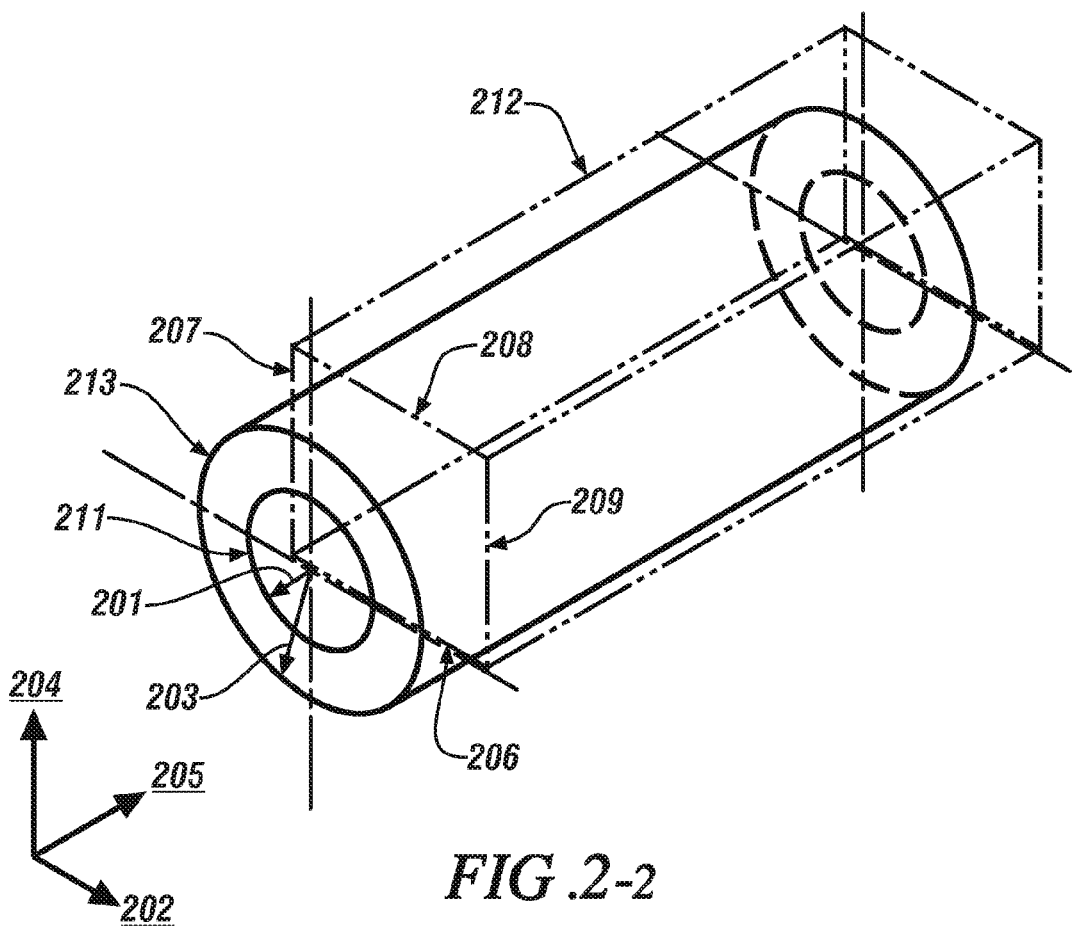

FIG. 2-1 graphically shows a two-dimensional perspective of highest priority, independent variables X1 and X2 in relation to battery power for an operating point, with variable X1 having limits of X1-min 207 and X1-max 209 and variable X2 having limits X2-min 206 and X2-max 208. In one embodiment the highest priority independent variables X1 and X2 are motor torques, i.e., Ta and Tb for the first and second torque machines 60, 62 shown in relation to battery power for an operating point, wherein the motor torques and battery powers have been transformed to a multi-dimensional coordinate system referred to herein as Tx/Ty space. Tx and Ty are shown with reference to coordinates 202 and 204, respectively. Battery power is transformed to Tx/Ty space with minimum and maximum battery power limits Pbat-min and Pbat-max, respectively, represented as concentric circles having radii of Pbat-min 201 and Pbat-max 203. As previously stated, the motor torques Ta and Tb are considered as highest priority variables, referred to herein as X1 and X2. Alternatively, other variables may be employed. The highest priority variables X1 and X2, e.g., motor torques Ta and Tb are correspondingly transformed to linear constraints as follows. In one embodiment the motor torques Ta and Tb representing torque commands for the first and second torque machines 60 and 62 are transformed to the Tx/Ty coordinate system as follows:

$$\begin{bmatrix} Tx \\ Ty \end{bmatrix} = \begin{bmatrix} A_1 & 0 \\ 0 & B_1 \end{bmatrix} * \begin{bmatrix} T_A \\ T_B \end{bmatrix} + \begin{bmatrix} A_2 \\ B_2 \end{bmatrix} \quad [1]$$

wherein
Tx is the transformation of motor torque Ta to Tx/Ty space;
Ty is the transformation of motor torque Tb to Tx/Ty space; and
$A_1, A_2, B_1, B_2$ are application-specific scalar values.

In this manner, EQ. 4 represents the transformation of motor torque Ta to Tx and the transformation of motor torque Tb to Ty.

Battery power is represented in the following relationships.

$$Pbat = (Tx^2 + Ty^2) + C \quad [2]$$

$$Pbat = R^2 + C \quad [3]$$

EQ. 2 represents the battery power Pbat transformed into Tx/Ty space. The battery power range between the maximum and minimum battery power limits Pbat-min and Pbat-max be calculated and graphed as radii (Rmin 201 and Rmax 203) with a center at locus (0, 0) in the Tx/Ty space, wherein:

$$Rmin = SQRT(Pbat\text{-}min - C)$$

$$Rmin = SQRT(Pbat\text{-}max - C)$$

The minimum and maximum battery power limits Pbat-min and Pbat-max correlate to various conditions, e.g. state of charge, temperature, voltage and usage (amp-hour/hour). The parameter C, above, is defined as the absolute minimum possible battery power at given motor speeds Na and Nb, ignoring motor torque limits. Physically, when Ta=0 and Tb=0 the mechanical output power from the first and second torque machines 60, 62 is zero. Physically Tx=0 and Ty=0 correspond to a maximum charging power condition for the ESD 85. The positive sign (+) is defined as discharging power from the ESD 85, and the negative sign (−) is defined as charging power into the ESD 85. The maximum battery power limit, i.e., Rmax 203 defines a maximum discharge battery power and the minimum battery power limit, i.e., Rmin 201 defines a maximum charge battery power.

FIG. 2-2 graphically shows a three-dimensional perspective of the transformed motor torques in relation to transformed battery power limits shown with reference to FIG. 2-1, with the motor torque and battery power having been transformed to Tx/Ty space, with Tx coordinate dimension 202 and Ty coordinate dimension 204 and a third Tz coordinate dimension 205 that corresponds to a third independent constraint X3. Cylinders 211 and 213 emerge with the Tz coordinate dimension 205, with cylinder 213 representing the maximum battery power limit, i.e., Rmax 203 extending in the Tz coordinate dimension 205 and defining the maximum discharge battery power, and cylinder 211 representing the minimum battery power limit, i.e., Rmin 201 and extending in the Tz coordinate dimension 205 and defining the maximum charge battery power.

A parallelepiped 212 emerges with the Tz coordinate dimension 205, representing the minimum and maximum X1 variables 206 and 208, respectively, and minimum and maximum X2 variables 207 and 209, respectively, each extending in the Tz coordinate dimension 205 with the third independent variable X3.

Figures 2, 3, 4, 5, 6:
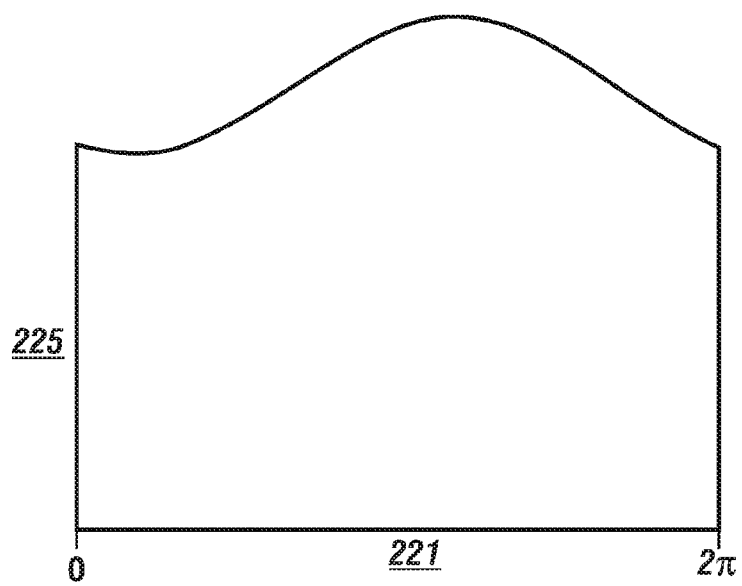
Figures 2, 3, 4, 5, 6, 7:
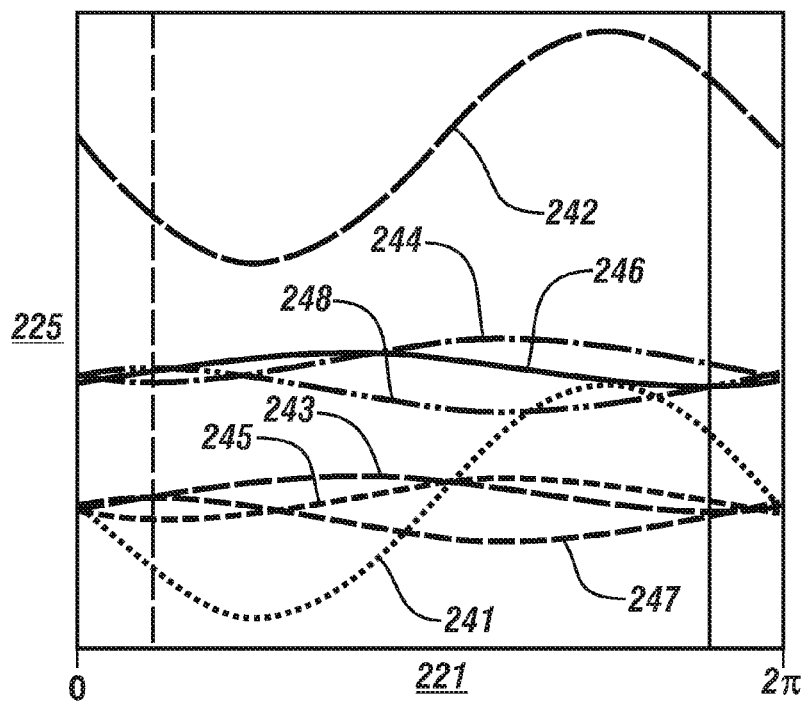
Figures 2, 3, 4, 5, 6, 7, 8:
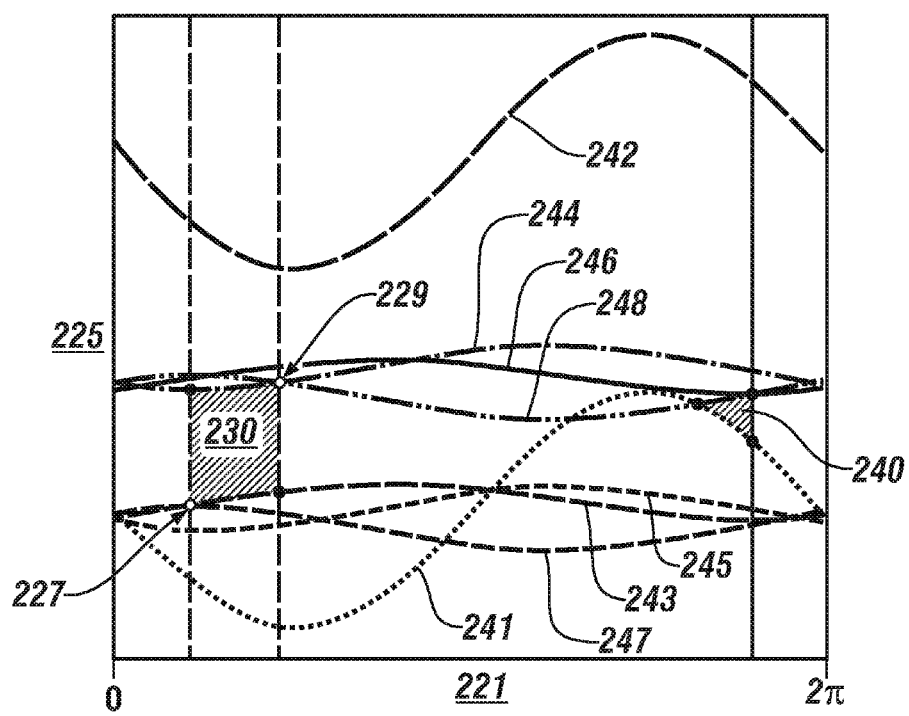
Figures 1, 3:
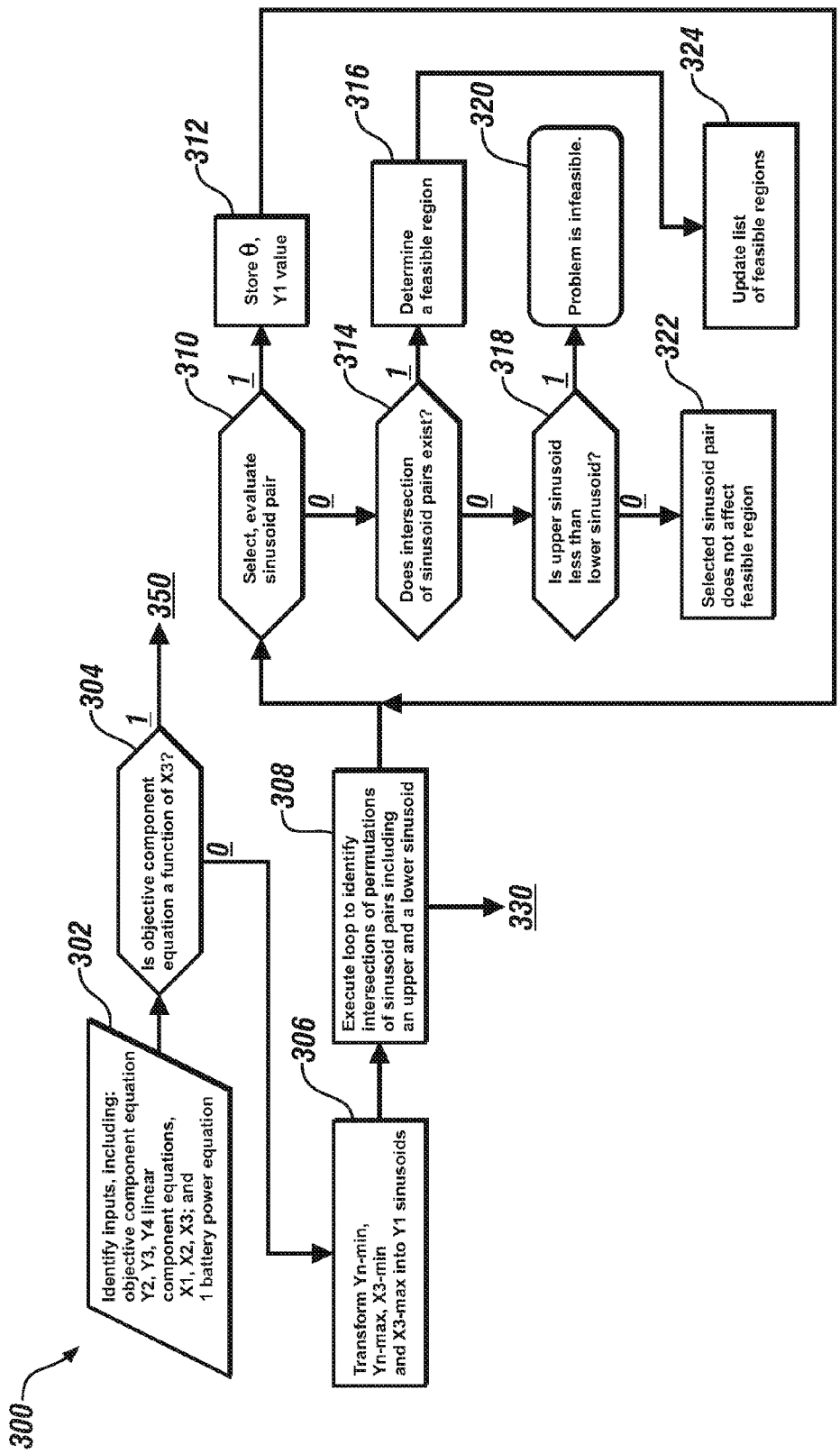
Figures 2, 3:
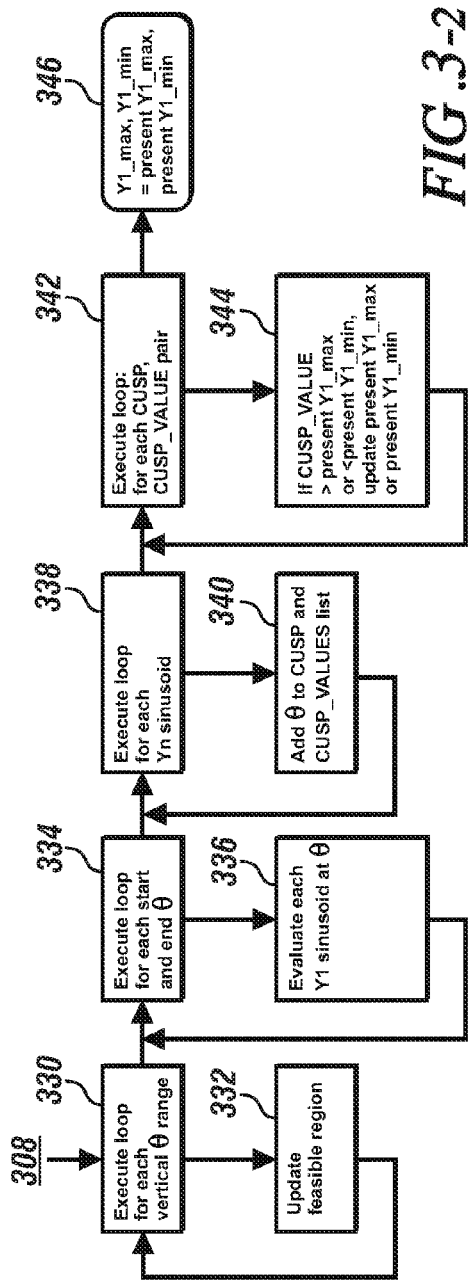
Figure 3:
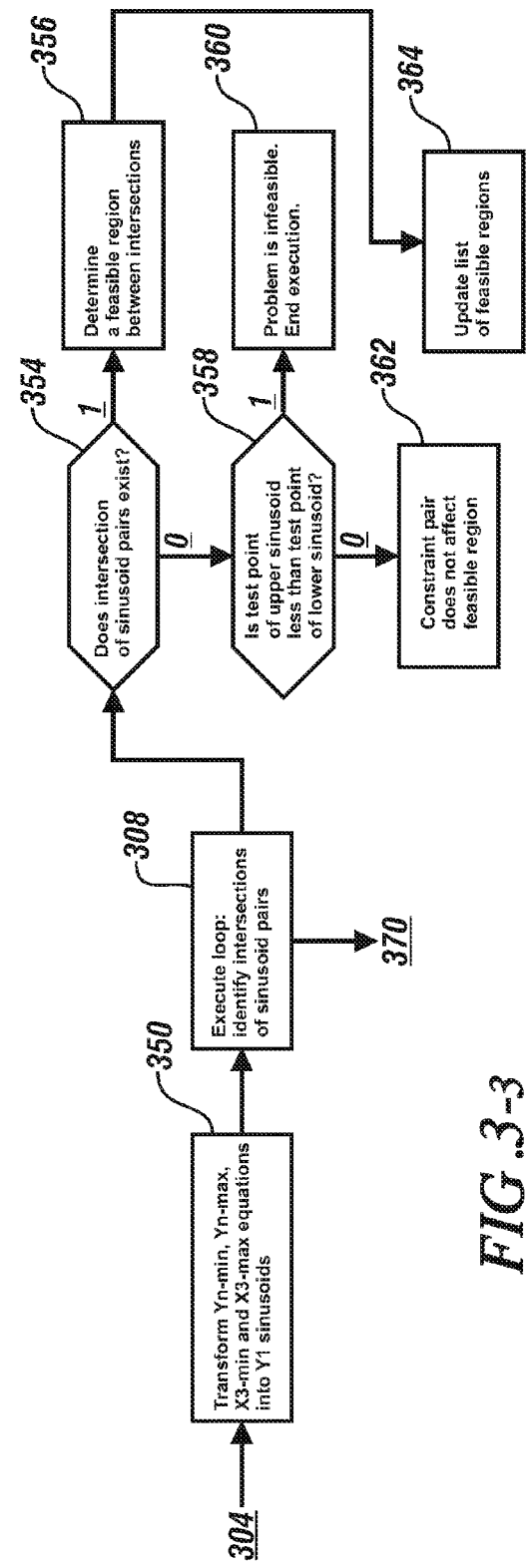
Figures 3, 4:
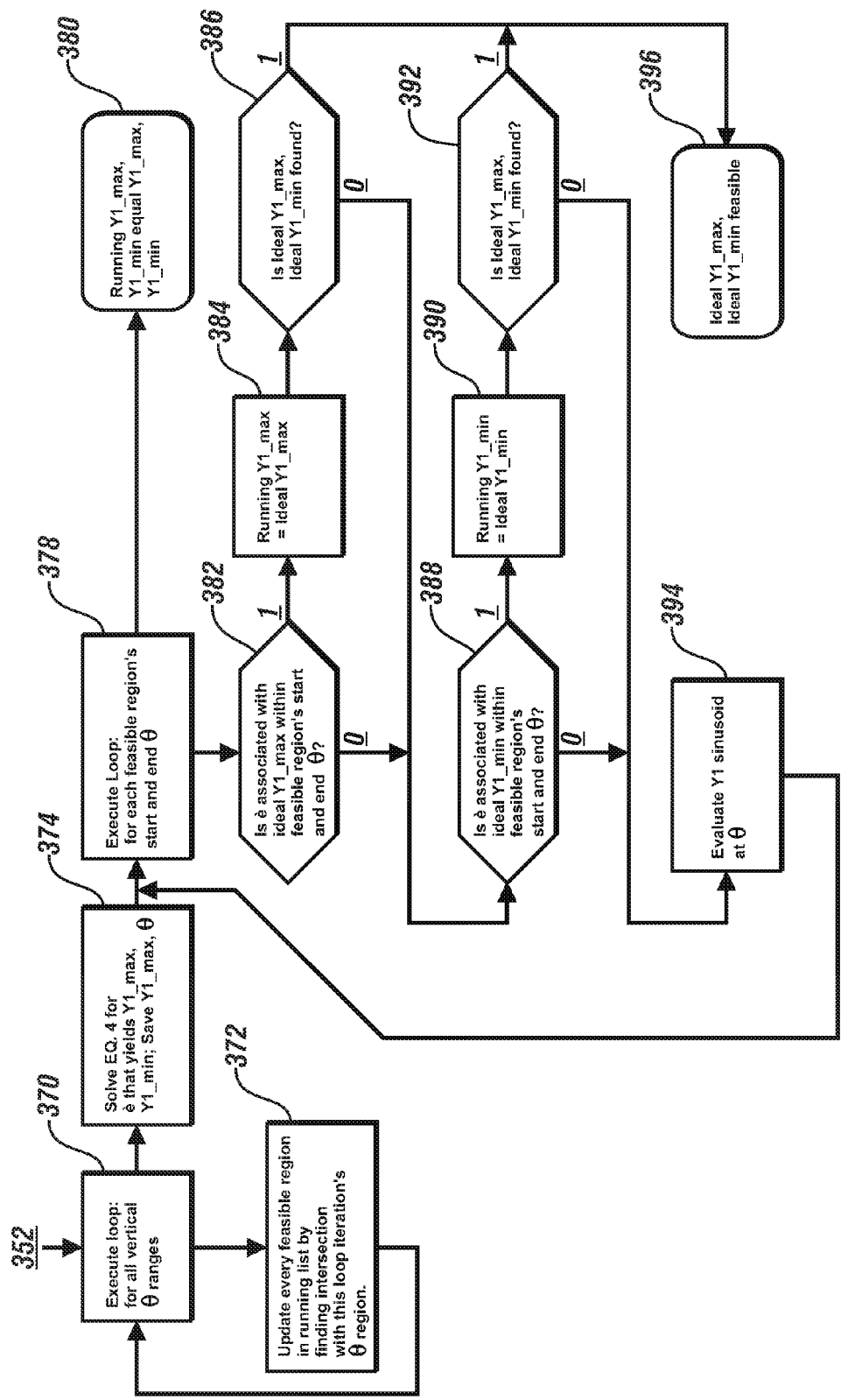

FIG. 2-3 graphically shows the three-dimensional perspective of motor torques in relation to battery power shown with reference to FIG. 2-2, and depicts dependent component torque and/or acceleration constraints that are generically described as Y2, Y3, . . . Yn, and are accorded lower priorities.

Three sets of the Yn dependent constraints are shown including minimum and maximum constraints for Y2, i.e., Y2-min 241 and Y2-max 242, minimum and maximum constraints for Y3, i.e., Y3-min 243 and Y3-max 244, and minimum and maximum constraints for Y4, i.e., Y4-min 245 and Y4-max 246.

An object component of interest, e.g., a torque or a rotational speed/acceleration may be expressed as an objective component equation. In operation, there can be a need to determine extrema, i.e., maximum and minimum torques or accelerations that an associated component can carry or produce while subject to constraints imposed by the system. These constraints include linear and nonlinear limits that are imposed on the object component of interest to properly control and protect elements of the hybrid powertrain system. The object component of interest can be represented by an objective component equation having the following form.

$$Y1 = aX1 + bX2 + cX3 + d \quad [4]$$

The term Y1 225 represents the object component of interest, e.g., a torque or a rotational speed/acceleration, and a, b, c, and d are known scalar values. The terms X1, X2, and X3 represent equations associated with the highest priority and independent variables in the system, e.g., torque actuators. The torque actuators can include the first and second torque machines 60, 62 and the engine 10. The minimum and maximum battery power limits, Pbat-min and Pbat-max, respectively are represented as non-linear equations that correspond to cylinders, e.g., cylinders 211 and 213 depicted and described with reference to FIG. 2-2. In one embodiment, the relationship described in EQ. 4 is subject to linear constraints as follows:

$$Y2\_min \leq Y2 = a2*X1 + b2*X2 + c2*X3 + D2 \leq Y2\_max$$

$$Y3\_min \leq Y3 = a3*X1 + b3*X2 + c3*X3 + D3 \leq Y3\_max$$

$$Y4\_min \leq Y4 = a4*X1 + b4*X2 + c4*X3 + D4 \leq Y4\_max$$

$$X1\_min \leq X1 \leq X1\_max$$

$$X2\_min \leq X2 \leq X2\_max$$

$$X3\_min \leq X3 \leq X3\_max \quad [5]$$

wherein a2, a3, a4, b2, b3, b4, c2, c3, and c4 terms are scalar values.

In one embodiment, the relationship described in EQ. 4 is subject to non-linear constraints as follows.

$$P\text{bat-min} \leq P\text{bat} = SQRT(X1^2 + X2^2) \leq P\text{bat-max} \quad [6]$$

As used herein, Y2, Y3, Y4 represent dependent component torque and/or acceleration constraints characterized with linear component equations, each with minimum and maximum limits, and X1, X2, X3 represent three independent actuators characterized by minimum and maximum limits. Thus, a solution to finding minimum and maximum values for the object component of interest, i.e., maximum and minimum torques or accelerations that an associated component can carry or produce while subject to constraints imposed by the system can be visualized as pairs of parallel planes cutting through a cylinder, as depicted in FIG. 2-3. The objective component equation is solved by employing the parallel cutting planes as constraints, wherein the solution is within the sets of parallel planes and is on the outside wall surface of the selected cylinder, i.e., one of cylinder 211 or cylinder 213.

FIG. 2-4 graphically shows a three-dimensional representation of data for the third independent variable X3 as circumscribed by one of the cylinders 211 and 213 representing one of the maximum battery power limit Rmax 203 and the minimum battery power limit Rmin 201. Thus the data shows the third independent variable X3 limited by and thus truncated with a single one of the Yn dependent constraints, i.e., one of minimum and maximum constraints for Y2, which are described with reference to FIG. 2-3. The cylinder includes a rotational angle θ 221 oriented about the Tz coordinate dimension 205 and ranging in rotation from θ=0 to 2π radians. The rotational angle θ 221 includes a vertical line 215 projecting in the Tz coordinate dimension 205 having a minimum value 205-2 and a maximum value 205-1.

FIG. 2-5 graphically shows a two-dimensional representation of the data for the third independent variable X3 as circumscribed by one of the cylinders 211 and 213 truncated with a single one of the Yn dependent constraints. The data for the third independent variable X3 is translated to the two-dimensional rectilinear plot with the independent variable X3 on the y-axis in relation to the rotational angle θ 221 from 0 to 2π radians on the x-axis. The vertical line 215 projecting in the Tz coordinate dimension 205 is shown for cross-reference with the three-dimensional representation of data for the third independent variable X3 shown in FIG. 2-4.

FIG. 2-6 graphically shows a linear transformation of the data representing the third independent variable X3 to Y1 225 in relation to the rotational angle θ 221. The third independent variable X3 transform to Y1 225 represents the object component of interest, e.g., a torque or a rotational speed/acceleration. Such transformation is effected by employing the relationship set forth in EQ. 4.

FIG. 2-7 graphically shows a 2-dimensional rectilinear plot showing Y1 225, wherein Y1 225 is the object component of interest in relation to the dependent component torque and/or acceleration constraints that are generically described as Y2, Y3, . . . Yn in relation to the rotational angle θ 221. The transformed Yn dependent constraints include Y2-min 241 and Y2-max 242, Y3-min 243 and Y3-max 244, Y4-min 245 and Y4-max 246, and Yn-min 247 and Yn-max 248.

FIG. 2-8 graphically shows the 2-dimensional rectilinear plot of FIG. 2-7 and incorporates constraints associated with X1, X2, and X3 in relation to the rotational angle θ 221, including identifying feasible regions 230 and 240 that are within all the constraints, including identifying overall extrema values for Y1_max 229 and Y1_min 227.

FIGS. 3-1 through 3-4 schematically show a control scheme 300 in flowchart form for solving the objective component equation recited in EQ. 4 to identify overall minimum and maximum states for the object component of interest, i.e., Y1, subject to the linear constraints associated with X1, X2, X3 and Y2, Y3, and Y4 and subject to a single battery power constraint, i.e., either a maximum or a minimum battery power. In one embodiment, the control scheme 300 employs algorithmic methods that reflect the analysis depicted with reference to FIGS. 2-1 to 2-8. The control scheme 300 is periodically executed in one of the aforementioned control modules to control operation of an embodiment of the powertrain system described with reference to FIG. 1. Table 2 is provided as a key for a portion of the control scheme 300 of FIGS. 3-1 and 3-2 wherein the numerically labeled blocks and the corresponding functions are set forth as follows.

TABLE 2

| BLOCK | BLOCK CONTENTS |
|---|---|
| 302 | Identify inputs, including: objective component equation (EQ. 4); Y2, Y3, Y4 linear component equations, each with minimum |

TABLE 2-continued

| BLOCK | BLOCK CONTENTS |
|---|---|
| | and maximum limits; |
| | 3 actuator minimum and maximum limits (X1, X2, X3); and 1 battery power equation |
| 304 | Is objective component equation a function of X3? |
| 306 | Transform Yn-min, Yn-max, X3-min and X3-max equations into Y1 sinusoids |
| 308 | Execute loop to identify intersections of permutations of sinusoid pairs including an upper and a lower sinusoid |
| 310 | Select sinusoid pair<br>Does sinusoid pair include two upper sinusoids or two lower sinusoids? |
| 312 | Store θ, Y1 value for any intersections of the sinusoid pairs in CUSP list |
| 314 | Does intersection of sinusoid pairs exist? |
| 316 | Where there are two intersections, determine a feasible region between intersections;<br>Where there is a single intersection, feasible region starts and ends at the single intersection |
| 318 | Is value of test point of upper sinusoid less than value of test point of lower sinusoid? |
| 320 | Problem is infeasible. End execution. |
| 322 | Selected sinusoid pair does not affect feasible region |
| 324 | Update list of feasible regions |
| 330 | Execute loop: for each vertical θ range: |
| 332 | Update every feasible region by finding intersection with vertical θ range |
| 334 | Execute loop: For each feasible region's start and end θ: |
| 336 | Evaluate each Y1 sinusoid at θ; find maximum of the lower sinusoids and minimum of the upper sinusoids;<br>Compare with Y1_max, Y1_min and update running Y1_max and running Y1_min accordingly |
| 338 | Execute loop: for each Yn sinusoid: |
| 340 | Add θs corresponding to sinusoid maximum and minimum points and corresponding Y1 value to CUSP and CUSP_VALUES list |
| 342 | Execute loop: for each CUSP, CUSP_VALUE pair |
| 344 | Is CUSP_VALUE greater than present Y1_max or less than present Y1_min?<br>If Yes, update respective present Y1_max or present Y1_min |
| 346 | Y1_max, Y1_min set equal to present Y1_max, present Y1_min |

The control scheme 300 is configured to determine overall minimum and maximum states, i.e., Y1_min and Y1_max, respectively, for the object component of interest Y1, subject to the linear constraints associated with X1, X2, X3 and Y2, Y3, and Y4 and subject to a single battery power constraint, i.e., either a maximum or a minimum battery power.

Initially inputs are identified, including the objective component equation (EQ. 4), the Y2, Y3, Y4 linear component equations each having minimum and maximum limits and three independent actuators (X1, X2, X3) having minimum and maximum limits (EQ. 5), and a single battery power equation (EQ. 6). The single battery power equation represents any battery power between Pbat-min and Pbat-max (302).

An initial analysis determines whether the objective component equation (EQ. 4) is a function of independent actuator X3 (304). A first analysis occurs when the objective component equation (EQ. 4) is a function of independent actuator X3 (304)(1). A second analysis occurs when the objective component equation (EQ. 4) is not a function of independent actuator X3 (304)(0).

The first analysis includes transforming all the dependent component torque and/or acceleration constraints described as Y2, Y3, ... Yn, i.e., those selected equations recited in EQ. 5, into Y1 sinusoids. Exemplary Y1 sinusoids for the minimum and maximum Y2, Y3, and Y4 constraints are shown with reference to FIG. 2-7, and a suitable algorithm can be developed consistent with the transformation described with reference to FIGS. 2-4, 2-5, and 2-6 (306).

A routine is repeatedly executed to evaluate all permutations of sinusoid pairs for the minimum and maximum Y2, Y3, and Y4 constraints including upper (maximum) and lower (minimum) sinusoids to identify intersections (308). During each portion of the routine, two of the constraints are selected and it is determined whether the selected constraints are both upper sinusoids or are both lower sinusoids (310). If so (310)(1), where there is an intersection of the selected constraints, a corresponding θ value and Y1 value are captured and stored in a CUSP/CUSP_values list (312).

This includes determining whether each intersection is a START point or an END point by evaluating derivatives of the sinusoids at that point. If the derivative of the upper sinusoid is greater than the derivative of the lower sinusoid at that intersection, then the θ value at that intersection is a START point. Otherwise, the θ value at that intersection is an END point, i.e., for that θ range, it is the largest θ for which the two constraints being considered are feasible. The present iteration ends. If the selected constraints are not both upper sinusoids or are not both lower sinusoids (310)(0), it is determined whether there is an intersection of the selected constraints (314). If there is at least one intersection (314)(1), a feasible θ region is determined between the intersections where there are two intersections, and a feasible θ region starts and ends at the single intersection where there is a single intersection (316). A running list of feasible θ regions is updated by intersecting every feasible region with the present iteration's new feasible θ region (324). The present iteration ends. If there is no intersection (314)(0), it is determined whether a value of one of the test points of the upper sinusoid are less than a value of a corresponding one of the test points of the lower sinusoid (318), and if so (318)(1), the problem is deemed to have an infeasible solution and execution ends (320). If this is not the case (318)(0), the selected constraint pair has no effect upon the feasible θ regions (322).

When the routine has evaluated all permutations of sinusoid pairs (308)(1), the system proceeds to repeatedly execute a routine that evaluates all vertical θ ranges (330). For each vertical θ range from one of the X1 limits, the X2 limits, and the Y constraints that are not functions of X3, the running list of feasible θ regions is updated to include any intersection with the vertical θ range (332).

The system proceeds to repeatedly execute a routine that evaluates each feasible θ region's start and end θ values (334). This includes evaluating each Y1 sinusoid at each of the start and end θ values and finding maximum of the lower sinusoid at the θ value and a minimum of the upper sinusoid at the θ value, with those values compared to an as-of-yet best Y1_max, i.e., a running Y1_max value and an as-of-yet best Y1_min, i.e., a running Y1_min value respectively. The system updates the running Y1_max and/or Y1_min if a new best corresponding value is found. The running Y1_max value and running Y1_min value are updated accordingly (336). Thus at each value for θ where the routine is executed, there is a chance that the lowest upper sinusoid might be greater than the as-of-yet Y1_max thus making it the new running Y1_max. Similarly, at each value for θ where the routine is executed, there is a chance that the highest lower sinusoid might be less than the running Y1_min thus making it the new running Y1_min.

The system proceeds to repeatedly execute a routine that evaluates each Yn sinusoid (338). This includes adding θ values corresponding to sinusoid maximum and minimum points and corresponding Y1 value to the CUSP/CUSP_VALUES list (340).

The system proceeds to repetitively execute a routine that evaluates the CUSP/CUSP_VALUES list (342), which includes evaluating each of the elements in the CUSP/CUSP_VALUES to determine whether the CUSP_VALUE is greater than the running Y1_max or less than the running Y1_min from the list of feasible θ regions, and updating the running Y1_max and/or the running Y1_min accordingly (344).

Furthermore, during this routine all the CUSP/CUSP_VALUES are evaluated, and any CUSP/CUSP_VALUES whose cusp (i.e., θ value) does not fall within a feasible θ region is disregarded. Each remaining CUSP value is evaluated to determine if any other constraints are violated. Thus, only if a CUSP/CUSP_VALUE stems from a feasible θ AND does not violate any other constraints is it permitted to replace the running Y1_max or running Y1_min. At the end of this set of interations, the final running Y1_max and the final running Y1_min become final values for Y1_max and Y1_min (346), which can be employed to control operation of the powertrain system.

Table 3 is provided as a key for a portion of the control scheme 300 of FIGS. 3-3 and 3-4 wherein the numerically labeled blocks and the corresponding functions are set forth as follows, and dealing with a situation wherein Y1 is not a function of X3 (304)(0).

TABLE 3

| BLOCK | BLOCK CONTENTS |
|---|---|
| 350 | Transform Yn-min, Yn-max, X3-min and X3-max equations into Y1 sinusoids |
| 352 | Execute loop to identify intersections of all permutations of sinusoid pairs including an upper and a lower sinusoid |
| 354 | Does intersection of sinusoid pairs exist? |
| 356 | Where there are two intersections, determine a feasible region between intersections; Where there is a single intersection, feasible region starts and ends at the single intersection |
| 358 | Is test point of upper sinusoid less than test point of lower sinusoid? |
| 360 | Problem is infeasible. End execution. |
| 362 | This constraint pair does not affect feasible region |
| 364 | Update list of feasible regions |
| 370 | Execute loop: for all vertical θ ranges |
| 372 | Update every feasible region in running list by finding intersection with this loop iteration's θ region. |
| 374 | Solve EQ. 4 for θ that yields Y1_max, Y1_min; Save Y1_max, θ |
| 378 | Execute Loop: for each feasible region's start and end θ |
| 380 | Running Y1_max, Y1_min equal Y1_max, Y1_min |
| 382 | Is θ associated with ideal Y1_max within feasible region's start and end θ? |
| 384 | Running Y1_max = Ideal Y1_max |
| 386 | Ideal Y1_max, Ideal Y1_min found? |
| 388 | Is θ associated with ideal Y1_min within feasible region's start and end θ? |
| 390 | Running Y1_min = Ideal Y1_min |
| 392 | Ideal Y1_max, Ideal Y1_min found? |
| 394 | Evaluate Y1 sinusoid at θ and compare with running Y1_max, running Y1_min; update Y1_min, Y1_max |
| 396 | Ideal Y1_max, Ideal Y1_min feasible and equal to final running Y1_max, running Y1_min |

The first analysis includes transforming all the dependent component torque and/or acceleration constraints described as Y2, Y3, . . . Yn, i.e., those selected equations recited in EQ. 5, into Y1 sinusoids. Exemplary Y1 sinusoids for the minimum and maximum Y2, Y3, and Y4 constraints are shown with reference to FIG. 2-7, and a suitable algorithm can be developed consistent with the transformation described with reference to FIGS. 2-4, 2-5, and 2-6 (350).

A routine is repeatedly executed to evaluate all permutations of sinusoid pairs for the minimum and maximum Y2, Y3, and Y4 constraints including an upper (maximum) and a lower (minimum) sinusoid to identify intersections (352). It is determined whether there is an intersection of the selected constraints (354). If there is at least one intersection (354)(1), a feasible θ region is determined between the intersections where there are two intersections, and a feasible θ region starts and ends at the single intersection where there is a single intersection (356). A running list of feasible θ regions is updated by intersecting every feasible region with the present repetition of the routine new feasible θ region, and the present repetition of the routine ends (364).

If there is no intersection (354)(0), it is determined whether values of test points of the upper sinusoid are less than values of corresponding test points of the lower sinusoid (358), and if so (358)(1), the problem is deemed to have an infeasible solution and execution ends (360). If this is not the case (358)(0), the selected constraint pair has no effect upon the feasible θ regions (362). When the repeated execution of the routine has evaluated all permutations of minimum and maximum sinusoid pairs, the system proceeds to repeatedly execute a routine that evaluates all vertical θ ranges from one of the X1 limits, the X2 limits, and the Y constraints that are not functions of X3 (370). Every feasible region in running list is updated by finding intersection with the routine's current iteration's θ region (372).

The control scheme solves EQ. 4 to identify θ that yields Y1_max, Y1_min, and the results are saved to identify Y1_max and Y_min (374), and another iteration is executed to identify start and end θ values for each feasible region (378). This includes setting the running Y1_max value and the running Y1_min value as the corresponding Y1_max and Y_min (380). For each feasible region, it is determined whether θ associated with ideal Y1_max is within the start and end θ of any of the feasible regions (382). If so (382)(1), the running Y1_max value is set equal to the ideal Y1_max (384). When both the ideal Y1_max and ideal Y1_min have been found (386)(1), the values for ideal Y1_max and ideal Y1_min are feasible and are employed as the final Y1_max and final Y1_min (396). Otherwise (386)(0) for each feasible region, it is determined whether θ associated with ideal Y1_min is within the start and end θ of the feasible region (388), and if so, (388)(1), the running Y1_min value is set equal to the ideal Y1_min (390). When both the ideal Y1_max and ideal Y1_min have been found (392)(1), the values for ideal Y1_max and ideal Y1_min are deemed feasible and are employed as the final Y1_max and final Y1_min (396). Otherwise (388)(0), (392)(0), each Y1 sinusoid is evaluated at each of the start and end θ values to find a maximum of the lower sinusoid at the θ value and a minimum of the upper sinusoid at the θ value, with those values compared to the running Y1_max value and the running Y1_min value respectively. The running Y1_max value and running Y1_min value are updated accordingly (394). When both the ideal Y1_max and ideal Y1_min have been found, the values for ideal Y1_max and ideal Y1_min are deemed feasible and are employed as the final Y1_max and final Y1_min (396).

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method to control operation of a powertrain system including an internal combustion engine, a multi-mode transmission and a plurality of torque machines, said transmission configured to transfer torque among the engine, the torque machines, and an output member, the method comprising:
  establishing an objective component equation corresponding to an object component of interest;
  imposing, by a controller, a plurality of linear constraints and a non-linear constraint on the objective component equation;
  solving the objective component equation in relation to the plurality of the linear constraints and the non-linear constraint to determine extrema for the object component of interest; and
  employing said extrema to control operation of the powertrain system.

2. The method of claim 1, wherein solving the objective component equation comprises solving an objective component equation in accordance with the following relationship:

$$Y1 = aX1 + bX2 + cX3 + d$$

wherein
  Y1 represents the object component of interest,
  a, b, c and d are known scalar values, and
  X1, X2, and X3 represent highest priority and independent constraints in the powertrain system.

3. The method of claim 2, wherein X1 and X2 represent torque constraints associated with the torque machines.

4. The method of claim 2, wherein X3 represents constraints associated with the engine.

5. The method of claim 1, wherein the object component of interest comprises one of a torque constraint and an acceleration constraint associated with an element of the powertrain system.

6. The method of claim 1, wherein the objective component equation comprises objective component equation in accordance with the following relationship:

$$Y1 = aX1 + bX2 + cX3 + d$$

wherein
  Y1 represents the object component of interest,
  X1 and X2 represent independent torque constraints associated with the torque machines,
  X3 represents an independent torque constraint for the engine, and
  a, b, c, d represent known scalar values; and
wherein solving the objective component equation comprises subjecting the objective component equation to a plurality of constraints, including $$Y2\_min \leq Y2 = a2*X1 + b2*X2 + c2*X3 + D2 \leq Y2\_max$$

$$Y3\_min \leq Y3 = a3*X1 + b3*X2 + c3*X3 + D3 \leq Y3\_max$$

$$Y4\_min \leq Y4 = a4*X1 + b4*X2 + c4*X3 + D4 \leq Y4\_max$$

$$X1\_min \leq X1 \leq X1\_max$$

$$X2\_min \leq X2 \leq X2\_max$$

$$X3\_min \leq X3 \leq X3\_max$$

wherein
  Y2, Y3, and Y4 represent dependent component constraints comprising one of a torque constraint and an acceleration constraint associated with an element of the powertrain system, and
  a2, b2, c2, a3, b3, c3, a4, b4, c4, D2, D3 and D4 represent known scalar values; and
wherein the non-linear constraint is represented in accordance with the following relationship:

$$P\text{bat-min} \leq P\text{bat} = SQRT(X1^2 + X2^2) \leq P\text{bat-max}$$

wherein Pbat represents battery power and Pbat-min and Pbat-max represent minimum and maximum battery power limits, respectively.

7. The method of claim 6, wherein dependent component constraints Y2, Y3, and Y4 comprise torque and acceleration constraints associated with a component of the powertrain system.

8. The method of claim 1, wherein solving the objective component equation comprises determining a maximum torque that the object component of interest can sustain subject to the plurality of linear constraints and the non-linear constraint.

9. The method of claim 1, wherein solving the objective component equation comprises determining a minimum torque that the object component of interest can sustain subject to the plurality of linear constraints and the non-linear constraint.

10. The method of claim 1, wherein solving the objective component equation comprises determining a maximum acceleration that the object component of interest can sustain subject to the plurality of linear constraints and the non-linear constraint.

11. The method of claim 1, wherein solving the objective component equation comprises determining a minimum acceleration that the object component of interest can sustain subject to the plurality of linear constraints and the non-linear constraint.

12. The method of claim 1, wherein imposing a non-linear constraint on the objective component equation comprises imposing minimum and maximum battery power constraints upon the objective component equation.

13. A method to control operation of a powertrain system including an internal combustion engine, a multi-mode transmission and a plurality of torque machines, said transmission configured to transfer torque among the engine, the torque machines, and an output member, the method comprising:
  establishing an objective component equation corresponding to an object component of interest;
  imposing, by a controller, a plurality of linear constraints and a non-linear constraint on the objective component equation;
  solving the objective component equation in relation to the plurality of the linear constraints and the non-linear constraint to determine extrema for the object component of interest; and
  employing said extrema to control operation of the powertrain system;
  wherein the objective component equation comprises objective component equation in accordance with the following relationship:

$$Y1 = aX1 + bX2 + cX3 + d$$

wherein
  Y1 represents the object component of interest,
  X1 and X2 represent independent torque constraints associated with the torque machines,
  X3 represents an independent torque constraint for the engine, and
  a, b, c, d represent known scalar values; and
wherein solving the objective component equation comprises subjecting the objective component equation to a plurality of constraints, including $$Y2\_min \leq Y2 = a2*X1 + b2*X2 + c2*X3 + D2 \leq Y2\_max$$

$$Y3\_min \leq Y3 = a3*X1 + b3*X2 + c3*X3 + D3 \leq Y3\_max$$

$$Y4\_min \leq Y4 = a4*X1 + b4*X2 + c4*X3 + D4 \leq Y4\_max$$

$X1\_min \leq X1 \leq X1\_max$ $X2\_min \leq X2 \leq X2\_max$ $X3\_min \leq X3 \leq X3\_max$ wherein
Y2, Y3, and Y4 represent dependent component constraints comprising one of a torque constraint and an acceleration constraint associated with an element of the powertrain system, and
a2, b2, c2, a3, b3, c3, a4, b4, c4, D2, D3 and D4 represent known scalar values; and
wherein the non-linear constraint is represented in accordance with the following relationship:

$Pbat\text{-}min \leq Pbat = SQRT(X1^2 + X2^2) \leq Pbat\text{-}max$ wherein Pbat represents battery power and Pbat-min and Pbat-max represent minimum and maximum battery power limits, respectively;
transforming said dependent component constraints Y2, Y3, and Y4 into sinusoids;
determining intersections between selected pairs of said sinusoids;
identifying feasible θ regions corresponding the intersections between selected pairs of said sinusoids and the independent torque constraints X1, X2, and X3, wherein the feasible θ regions are associated with one of the minimum and the maximum battery power limits; and
determining said extrema for the object component of interest based upon the feasible θ regions.

14. A method to determine extrema for controlling operation of a powertrain system including an internal combustion engine, a multi-mode transmission and a plurality of torque machines, said transmission configured to transfer torque among the engine, the torque machines, and an output member, the method comprising:
establishing an objective component equation corresponding to an object component of interest;
determining, by a controller, extrema for the object component of interest by solving the objective component equation in relation to a plurality of linear constraints and a non-linear constraint; and
employing said extrema to control operation of the powertrain system associated with the object component of interest.

15. The method of claim 14, wherein solving the objective component equation comprises solving an objective component equation in accordance with the following relationship:

$Y1 = aX1 + bX2 + cX3 + d$ wherein
Y1 represents the object component of interest,
X1 and X2 represent independent torque constraints associated with the torque machines,
X3 represents an independent torque constraint for the engine, and
a, b, c, d represent known scalar values.

16. The method of claim 15, wherein solving the objective component equation further comprises subjecting the objective component equation to a plurality of constraints, including $Y2\_min \leq Y2 = a2^*X1 + b2^*X2 + c2^*X3 + D2 \leq Y2\_max$ $Y3\_min \leq Y3 = a3^*X1 + b3^*X2 + c3^*X3 + D3 \leq Y3\_max$ $Y4\_min \leq Y4 = a4^*X1 + b4^*X2 + c4^*X3 + D4 \leq Y4\_max$ $X1\_min \leq X1 \leq X1\_max$ $X2\_min \leq X2 \leq X2\_max$ $X3\_min \leq X3 \leq X3\_max$ wherein
Y2, Y3, and Y4 represent dependent component constraints comprising one of a torque constraint and an acceleration constraint associated with an element of the powertrain system, and
a2, b2, c2, a3, b3, c3, a4, b4, c4, D2, D3 and D4 represent known scalar values.

17. The method of claim 16, wherein dependent component constraints Y2, Y3, and Y4 comprise torque and acceleration constraints associated with a component of the powertrain system.

18. The method of claim 15, wherein the object component of interest comprises one of a torque constraint and an acceleration constraint associated with an element of the powertrain system.

19. The method of claim 15, wherein the non-linear constraint is represented in accordance with the following relationship:

$Pbat\text{-}min \leq Pbat = SQRT(X1^2 + X2^2) \leq Pbat\text{-}max$ wherein Pbat represents battery power and Pbat-min and Pbat-max represent minimum and maximum battery power limits, respectively.

20. A method to determine extrema for controlling operation of a powertrain system including an internal combustion engine, a multi-mode transmission and a plurality of torque machines, said transmission configured to transfer torque among the engine, the torque machines, and an output member, the method comprising:
establishing an objective component equation corresponding to an object component of interest;
determining, by a controller, extrema for the object component of interest by solving the objective component equation in relation to a plurality of linear constraints and a non-linear constraint; and
employing said extrema to control operation of the powertrain system associated with the object component of interest;
wherein solving the objective component equation comprises solving an objective component equation in accordance with the following relationship:

$Y1 = aX1 + bX2 + cX3 + d$ wherein
Y1 represents the object component of interest,
X1 and X2 represent independent torque constraints associated with the torque machines,
X3 represents an independent torque constraint for the engine, and
a, b, c, d represent known scalar values;
wherein solving the objective component equation further comprises subjecting the objective component equation to a plurality of constraints, including $Y2\_min \leq Y2 = a2^*X1 + b2^*X2 + c2^*X3 + D2 \leq Y2\_max$ $Y3\_min \leq Y3 = a3^*X1 + b3^*X2 + c3^*X3 + D3 \leq Y3\_max$ $Y4\_min \leq Y4 = a4^*X1 + b4^*X2 + c4^*X3 + D4 \leq Y4\_max$ $X1\_min \leq X1 \leq X1\_max$ $X2\_min \leq X2 \leq X2\_max$ $X3\_min \leq X3 \leq X3\_max$ wherein Y2, Y3, and Y4 represent dependent component constraints comprising one of a torque constraint and an acceleration constraint associated with an element of the powertrain system, and a2, b2, c2, a3, b3, c3, a4, b4, c4, D2, D3 and D4 represent known scalar values;

transforming said dependent component constraints Y2, Y3, and Y4 into sinusoids;

determining intersections between selected pairs of said sinusoids;

identifying feasible θ regions corresponding the intersections between selected pairs of said sinusoids and the independent torque constraints X1, X2, and X3 wherein the feasible θ regions are associated with one of the minimum and the maximum battery power limits; and determining said extrema for the object component of interest based upon the feasible θ regions.

\* \* \* \* \*